(12) United States Patent
Tanno et al.

(10) Patent No.: US 11,892,828 B2
(45) Date of Patent: Feb. 6, 2024

(54) FAULT DIAGNOSIS DEVICE, FAULT DIAGNOSIS METHOD AND MACHINE TO WHICH FAULT DIAGNOSIS DEVICE IS APPLIED

(71) Applicant: Hitachi, Ltd., Tokyo (JP)

(72) Inventors: Yohei Tanno, Tokyo (JP); Yuuki Shimizu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 17/041,358

(22) PCT Filed: Jan. 30, 2019

(86) PCT No.: PCT/JP2019/003132
§ 371 (c)(1),
(2) Date: Sep. 24, 2020

(87) PCT Pub. No.: WO2019/207881
PCT Pub. Date: Oct. 31, 2019

(65) Prior Publication Data
US 2021/0041863 A1    Feb. 11, 2021

(30) Foreign Application Priority Data
Apr. 24, 2018 (JP) ................. 2018-082847

(51) Int. Cl.
*G06F 11/30* (2006.01)
*G05B 23/02* (2006.01)

(52) U.S. Cl.
CPC ....... *G05B 23/0248* (2013.01); *G05B 23/027* (2013.01)

(58) Field of Classification Search
CPC .................................................. G05B 23/0248
See application file for complete search history.

(56) References Cited

FOREIGN PATENT DOCUMENTS

| JP | 01-274209 | * 11/1989 |
| JP | 1-274209 A | 11/1989 |

(Continued)

OTHER PUBLICATIONS

International Search Report (PCT/ISA/210) issued in PCT Application No. PCT/JP2019/003132 dated May 7, 2019 with English translation (two (2) pages).

(Continued)

*Primary Examiner* — Phuong Huynh
(74) *Attorney, Agent, or Firm* — Crowell & Moring LLP

(57) ABSTRACT

Personal dependency related to fault tree construction is reduced, and the reliability of an operating machine is improved by improving the accuracy of a fault diagnosis. The present invention provides a fault diagnosis device for a machine in operation, the device comprising: an abnormality degree analysis unit that calculates the abnormality degree of each component configuring the machine by comparing input/output data of the machine with a threshold value; a fault tree automatic generation unit that holds a fault tree of each component in which the fault of each component and the fault of a sensor in each component are associated with each other and generates the fault tree of the entire machine by coupling the fault trees of the components on the basis of a correlation between the input/output data of each component; a fault analysis unit that analyzes the fault of the machine on the basis of the abnormality degree and information of the fault tree of the entire machine; and a display unit that displays information analyzed by the fault analysis unit and issues an alarm.

5 Claims, 5 Drawing Sheets

(56) References Cited

FOREIGN PATENT DOCUMENTS

| | | |
|---|---|---|
| JP | 2000-194561 A | 7/2000 |
| JP | 2007-268018 A | 10/2007 |
| JP | 2017-111657 A | 6/2017 |

OTHER PUBLICATIONS

Japanese-language Written Opinion (PCT/ISA/237) issued in PCT Application No. PCT/JP2019/003132 dated May 7, 2019 (four (4) pages).

\* cited by examiner

FAULT DIAGNOSIS DEVICE, FAULT DIAGNOSIS METHOD AND MACHINE TO WHICH FAULT DIAGNOSIS DEVICE IS APPLIED

TECHNICAL FIELD

The present invention relates to a fault diagnosis device and a fault diagnosis method that diagnose a fault mode and a fault cause in real-time for a machine in operation on the basis of operation data, and a machine to which the fault diagnosis device is applied.

BACKGROUND ART

An FTA (Fault Tree Analysis) is a method of comprehensively analyzing a fault mode and a fault cause of a machine and a system. In the FTA, a fault cause and a fault mode that will possibly occur in the future are analyzed using a fault tree obtained by expanding a causal relationship between the fault mode and the fault cause of an evaluation target on a tree. The FTA in a design stage can lead to prevention of an accident by noticing a potential fault mode. In addition, the FTA when an accident occurs can contribute to an investigation into the cause of the accident and reoccurrence prevention.

However, as a problem of the fault tree used in the FTA, the quality of the fault tree depends on the skill or experience of a creator in some cases. For example, in the case where an inexperienced young person creates a fault tree, there is a possibility that the person cannot notice an unknown fault mode or cause. In the case where an experienced expert creates a fault tree, there is a possibility that the expert skips a reasonable phenomenon due to a jump of thought, or a phenomenon to be defined in the fault tree is to be missing.

In addition, a probability leading to the top phenomenon of the fault tree can be estimated by defining the probability of occurrence to each phenomenon in the tree. However, it is difficult to accurately define the probability of occurrence of each phenomenon for which enormous use conditions and environmental conditions are conceivable.

As a known example related to a fault diagnosis device using the FTA, Patent Literature 1 describes that "a weight is set to each fault mode in advance, and when a fault mode is detected before or during execution of an analysis procedure of another fault mode, the process is executed in accordance with the order of the set weights".

CITATION LIST

Patent Literature

Patent Literature 1 Japanese Unexamined Patent Application Publication No. 2007-268018

SUMMARY OF INVENTION

Technical Problem

In the fault diagnosis device using the FTA, a fault tree is used to estimate and process the fault mode and the fault cause of an evaluation target.

However, as described above, there is a problem that the quality of the fault tree depends on the skill or experience of a creator to cause omission or oversight in each phenomenon, or it is difficult to accurately define the probability of occurrence of each phenomenon.

Although Patent Literature 1 is a known example related to the fault diagnosis device using the FTA, information that is defined in advance in a database in the device is used as the fault tree, the fault mode, and the weights thereof used for a fault diagnosis.

Namely, the accuracy of the fault diagnosis depends on the accuracy of the fault tree and the fault mode that are defined in advance. In the process of the creation, there is a possibility that omission or oversight of each phenomenon and inaccuracy of the probability of occurrence cause variations in the accuracy of the fault diagnosis due to personal dependency.

On the basis of the above description, the present invention has been made to solve the above-described problems for a fault diagnosis device using an FTA, and an object thereof is to provide a fault diagnosis device and a fault diagnosis method that diagnose an appropriate fault mode and fault cause by reducing personal dependency on the basis of various data of a machine in operation, and a machine to which the fault diagnosis device is applied.

Solution to Problem

On the basis of the above description, the present invention provides "a fault diagnosis device for a machine in operation, the device comprising: an abnormality degree analysis unit that calculates the abnormality degree of each component configuring the machine by comparing input/output data of the machine with a threshold value; a fault tree automatic generation unit that holds a fault tree of each component in which the fault of each component and the fault of a sensor in each component are associated with each other and generates the fault tree of the entire machine by coupling the fault trees of the components on the basis of a correlation between the input/output data of each component; a fault analysis unit that analyzes the fault of the machine on the basis of the abnormality degree and information of the fault tree of the entire machine; and a display unit that displays information analyzed by the fault analysis unit and issues an alarm".

In addition, the present invention provides "a fault diagnosis method for a machine in operation configured using plural components including a sensor detecting input/output data, wherein a fault tree of each component in which the fault of each component and the sensor in each component are associated with each other is held, the fault tree of the entire machine is generated by coupling the fault trees of the components in accordance with a correlation between the input/output data of the plural components, and the fault of the machine is analyzed on the basis of information of the fault tree of the entire machine".

In addition, the present invention provides "a machine to which the above-described fault diagnosis device is applied".

Advantageous Effects of Invention

The fault tree of the entire machine is automatically generated on the basis of various data of the machine in operation in the fault diagnosis device according to the present invention, and thus personal dependency related to tree construction can be reduced.

In addition, according to embodiments of the present invention, the abnormality degree of each component and the fault degree of the entire machine are calculated in real-time on the basis of various data in operation and the automatically-generated fault tree, and thus an appropriate diagnosis can be conducted for the fault mode occurring at the time or a fault mode that will possibly occur in the future. In addition, the reliability of the machine operation can be improved by displaying the diagnosis information, by issuing an alarm, or by feeding back to the machine in operation.

DESCRIPTION OF EMBODIMENTS

Hereinafter, embodiments of the present invention will be described using the drawings.

First Embodiment

Figure 1:
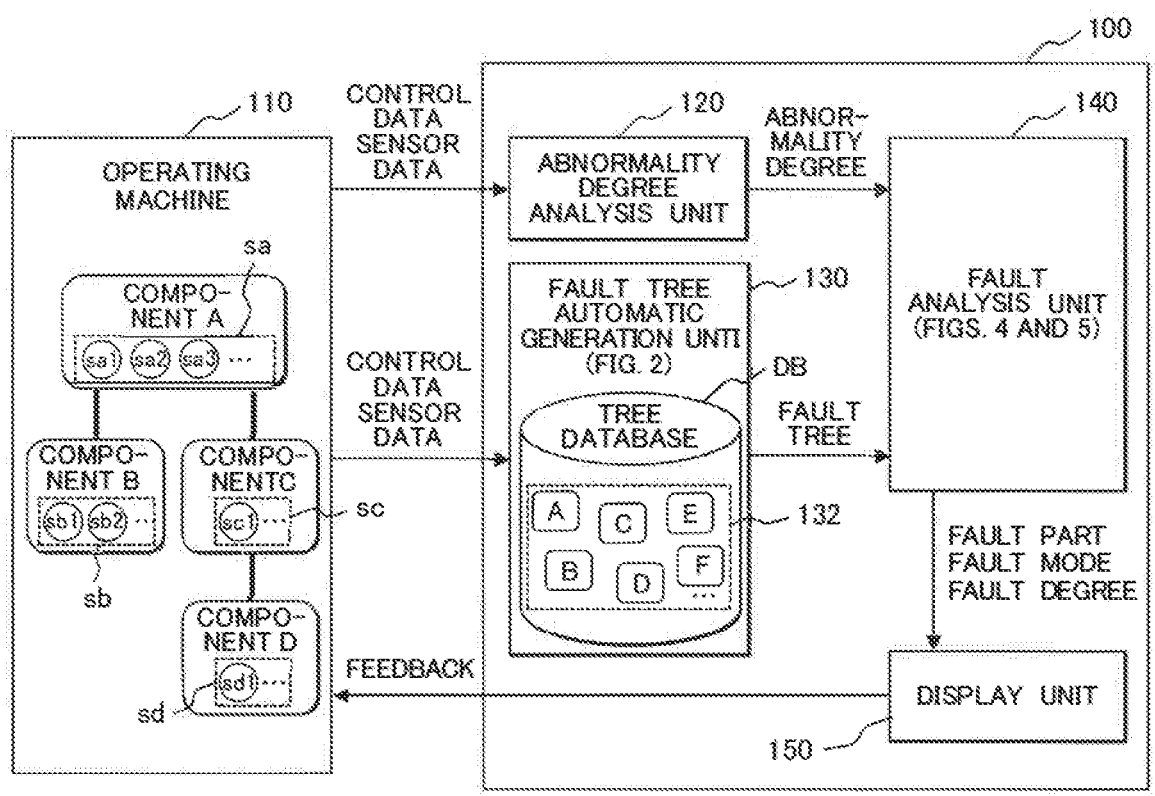
FIG. 1 is a diagram for showing a configuration example of a fault diagnosis device according to a first embodiment of the present invention.

FIG. 1 shows a diagram of a configuration example of a fault diagnosis device according to a first embodiment of the present invention.

A fault diagnosis device 100 of the present invention is applied to an operating machine 110, and is configured using an abnormality degree analysis unit 120, a fault tree automatic generation unit 130, a fault analysis unit 140, and a display unit 150.

First, the operating machine 110 to be diagnosed in the present invention will be described. In general, a machine is configured in such a manner that components such as electric components and machine elements are coupled thereto, and the operating machine 110 of FIG. 1 is shown by an example configured using a component A, a component B, a component C, and a component D. In addition, it is assumed that the component B and the component C are coupled to the component A, and the component D is coupled to the component C.

In addition, in order to monitor and control the state of the machine, various sensors S for measuring displacement, temperatures, and the like are attached to the operating machine 110. In the example of FIG. 1, sensors Sa such as Sa1, Sa2, and Sa3 are attached to the component A, and sensors Sb such as Sb1 and Sb2 are coupled to the component B. Likewise, sensors Sc and Sd are attached to the component C and the component D, respectively.

As described above, the operating machine 110 in the present invention is configured using plural components, these components are coupled thereto, and each of the components includes one or more sensors. In other words, a range including the sensors is grasped as a component in the present invention.

Next, functions to be included in the fault diagnosis device 100 will be described. First, a fault tree automatic generation unit 130 includes a tree database DB in which a component tree 132 defining causal relationships between fault modes and fault causes of various components such as electric components and machine elements is stored. In addition, sensor data from the operating machine 110 to be diagnosed and control data for the operating machine 110 are input in the fault tree automatic generation unit 130, and are used for creating a fault tree in the tree database DB. The detail of the fault tree automatic generation unit 130 will be described later using FIG. 2.

The control data and the sensor data for the operating machine 110 are also input in the abnormality degree analysis unit 120. The abnormality degree analysis unit 120 compares a threshold value (allowable value) set to each sensor of each component with output data of each sensor, and calculates an abnormality degree. The threshold value and the sensor data are compared with each other in real-time in a time series manner. As the value of the sensor data is closer to the threshold value, the abnormality degree is determined to be high. The abnormality degree is calculated for each sensor of each component.

The abnormality degrees of each component and each sensor output from the abnormality degree analysis unit 120 of FIG. 1 and the fault tree of the entire machine output from the fault tree automatic generation unit 130 are input into the fault analysis unit 140, and a fault part, a fault mode, a fault degree, and the like are obtained by an analysis in the fault analysis unit 140 to be displayed by the display unit 150. The detail of the fault analysis unit 140 and the display unit 150 will be described later using FIG. 4.

Hereinafter, each function configuring the fault diagnosis device 100 will be described in detail. First, concrete configurations and functions of the fault tree automatic generation unit 130 in FIG. 2 will be described.

Figure 2:
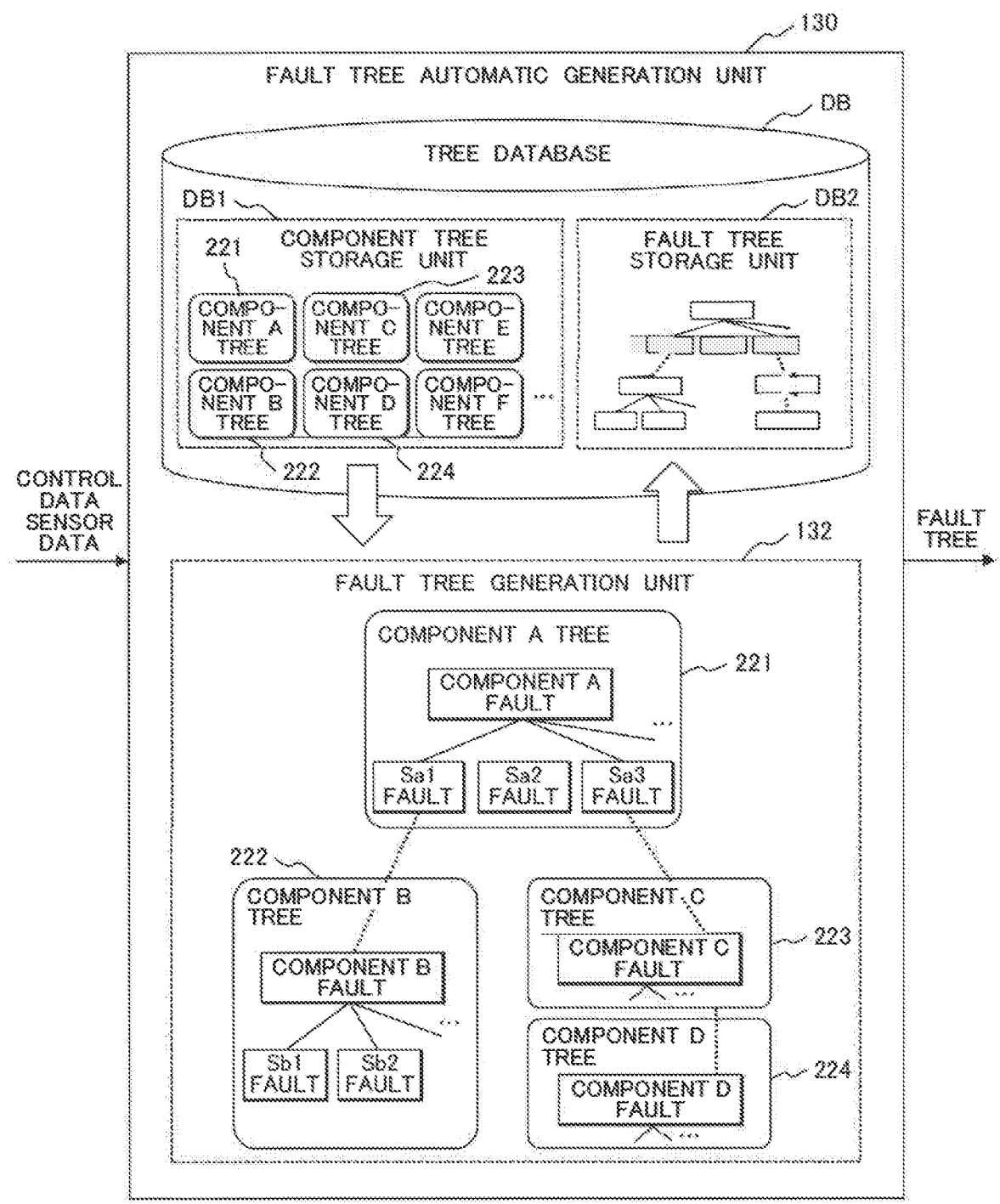
FIG. 2 is a diagram for showing a configuration example of a fault tree automatic generation unit.

The control data and the sensor data for the operating machine 110 are input in the fault tree automatic generation unit 130 of FIG. 2. In addition, the fault tree automatic generation unit 130 is configured using the tree database DB and a fault tree generation unit 132.

The tree database DB is configured using a component tree storage unit DB1 and a fault tree storage unit DB2. Component trees (221, 222, 223, 224, and the like) defining causal relationships between the fault modes and the fault causes of the various components such as electric components and machine elements are stored in the component tree storage unit DB1. On the contrary, a fault tree generated by the fault tree generation unit 132 is stored in the fault tree storage unit DB2, and is provided to the fault analysis unit 140 of FIG. 1.

The fault tree generation unit 132 couples the component trees (221, 222, 223, 224, and the like) of the various components stored in the component tree storage unit DB1, and automatically generates the fault tree of the entire operating machine.

As the component trees stored in the component tree storage unit DB1, 221, 222, 223, and 224 are exemplified in the fault tree generation unit 132 of FIG. 2. These component trees define the causal relationships between the fault modes and the fault causes of the various components. For example, in the component A tree 221, the fault of the component A is defined as a sensor Sa1 fault, a sensor Sa2 fault, and a sensor Sa3 fault. Likewise, in the component B tree 222, the fault of the component B is defined as a sensor Sb1 fault, a sensor Sb2 fault, and a sensor Sb3 fault. Other component trees 223 and 224 are configured in the same manner. It should be noted that in the causal relationship between the fault mode and the fault cause of the component, for example, the fault mode (component A fault) of the component is burning, and the fault causes are temperature excessiveness (temperature sensor Sa1), rotational speed excessiveness (rotational speed sensor Sa2), lubricant deficiency (flow rate sensor Sa3), and the like.

In the initial state where the fault diagnosis device 100 is applied to the operating machine 110, the plural component trees 221, 222, 223, and 224 are formed independently from each other, and the component trees are not coupled to each other. In the present invention, the component trees are coupled to each other using the control data and the sensor data obtained through an operation of the operating machine 110. The trees of the various components are coupled so as to simulate the entire machine on the basis of a correlation between pieces of data input into the fault tree automatic generation unit 130 from the operating machine 110.

Figure 3:
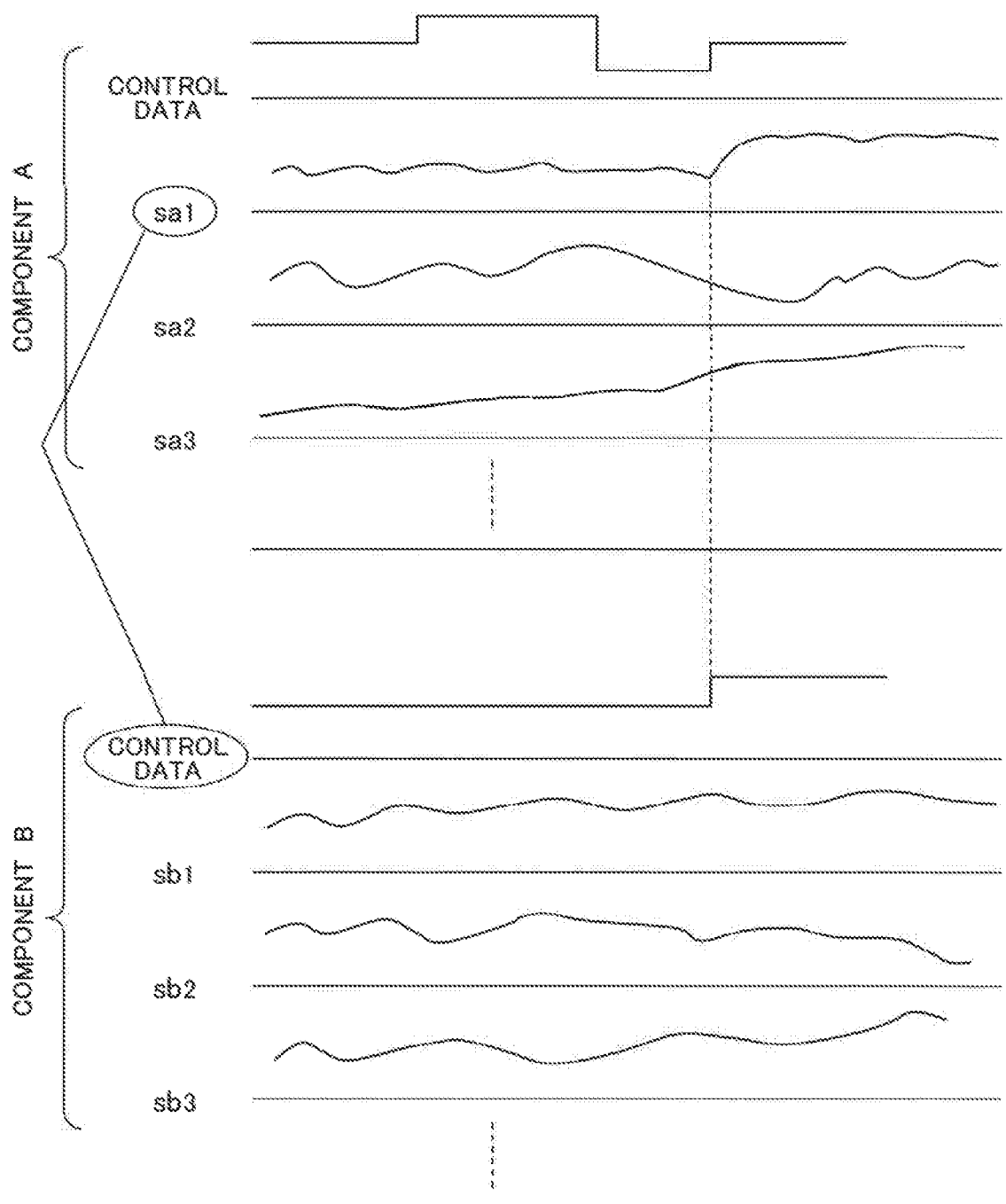
FIG. 3 is a diagram for showing a case of time changes in data input into the fault tree automatic generation unit 130.

FIG. 3 shows a case in which time changes in data input into the fault tree automatic generation unit 130 are shown, and exemplifies, from the upper side, time changes in the control data of the component A and detection values by the sensors Sa1, Sa2, and Sa3 and the control data of the component B and detection values by the sensors Sb1, Sb2, and Sb3.

When correlation coefficients between pieces of data input into the fault tree automatic generation unit 130 are calculated, a correlation coefficient between the control data controlling the component B and the sensor Sa1 of the component A is assumed to be the highest in the example of FIG. 3. In this case, the component B is linked with the sensor Sa1, and there is a high possibility that the fault of the component B leads to the fault of the sensor Sa1. In this case, the fault tree generation unit 132 couples, as shown in FIG. 2, the "Sa1 fault" of the phenomenon configuring the component A tree 221 with the "component B fault" of the phenomenon configuring the component B tree 222. The correlation can be similarly obtained between pieces of control data or between pieces of sensor data, and the tree is established by coupling pieces of data that are high in correlation. At this time, it is preferable to form the tree by including a causal relationship between two pieces of data that are high in correlation, such as which one is on the cause side or on the result side, or whether the two pieces of data affect each other.

Likewise, the component C tree 223 and the component D tree 224 are coupled to each other on the basis of a correlation between pieces of data, and the fault tree of the entire machine in which the components are coupled to each other is automatically established. The established fault tree of the entire machine is stored in the fault tree storage unit DB2 of the tree database DB, and can be reused when the fault diagnosis of a machine having a similar component configuration is conducted.

Figure 4:
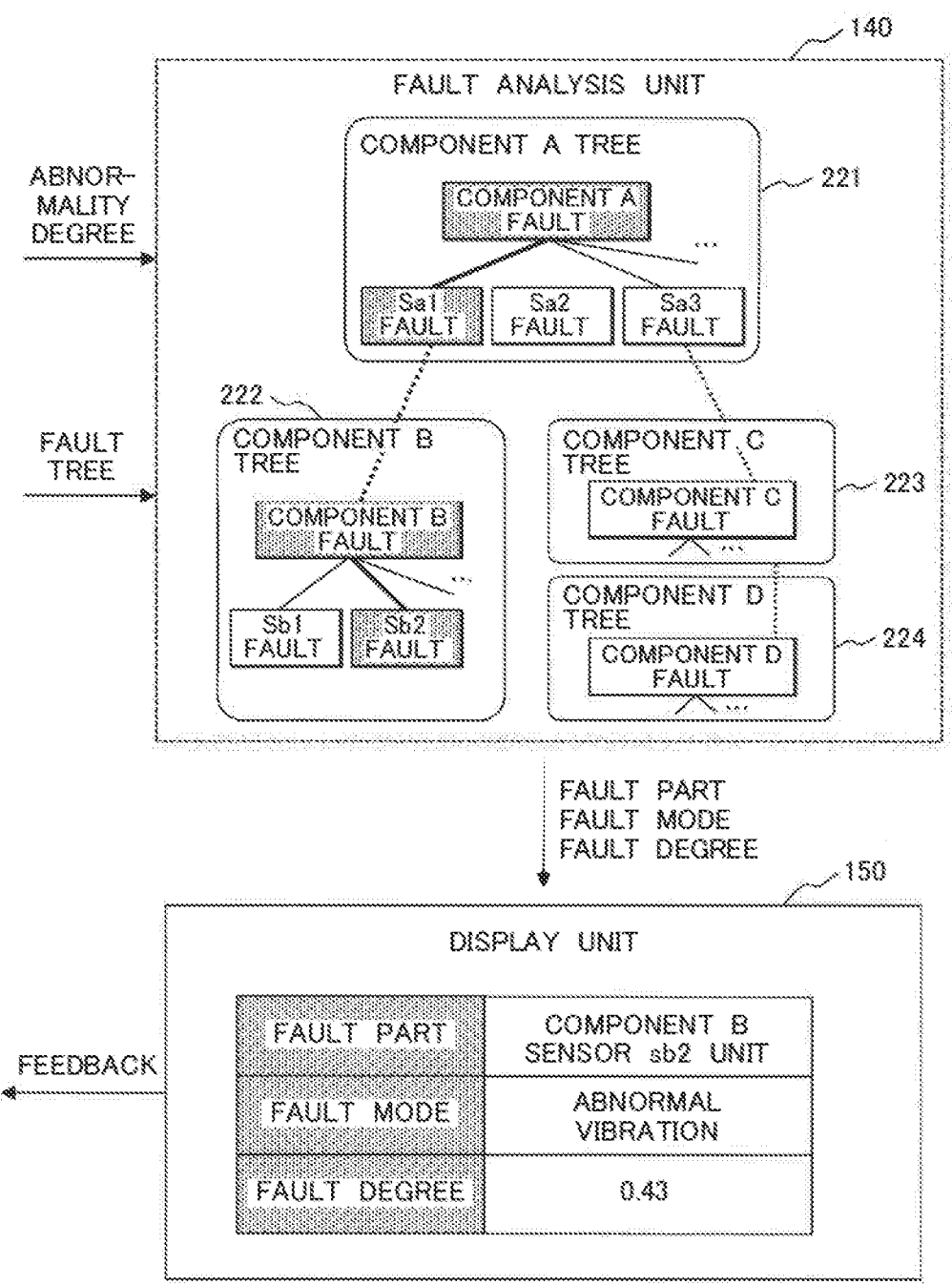
FIG. 4 is a diagram for showing detailed configurations of a fault analysis unit 140 and a display unit 150.

FIG. 4 is a diagram for showing detailed configurations of the fault analysis unit 140 and the display unit 150. According to FIG. 4, the abnormality degrees of each component and each sensor output from the abnormality degree analysis unit 120 of FIG. 1 and the fault tree of the entire machine output from the fault tree automatic generation unit 130 are input into the fault analysis unit 140.

As shown in FIG. 4, the fault analysis unit 140 analyzes the fault part, the fault mode, and the fault degree on the basis of the fault tree of the entire machine configured using the component A tree 221, the component B tree 222, the component C tree 223, and the component D tree 224 and the abnormality degrees of each component and each sensor.

For example, since the abnormality degrees of each component and each sensor are normalized in the abnormality degree analysis unit 120 using the output data and the threshold value, a part where there is a high possibility that a fault occurs in the entire machine can be estimated by listing the respective abnormality degrees in ascending order.

In addition, for example, by integrating the abnormality degree of each sensor in the component, the fault degree of the component alone can be estimated, and by integrating the fault degree of each component, the fault degree of the entire machine can be estimated. Further, by combining the fault part and the fault tree with each other, the fault mode occurring at the time and the fault mode that will synchronously occur can be estimated.

For example, the thick line parts of FIG. 4 can show that in the case where a fault (abnormal vibration or the like) occurs in the sensor Sb2 of the component B, it leads to the fault of the component B, possibly leading to the fault of the sensor Sa1 coupled thereto and the component A.

The fault part, the fault mode, and the fault degree output from the fault analysis unit 140 are input into the display unit 150. The display unit 150 outputs and clearly specifies the fault part, the fault mode, and the fault degree in a simplified format. In addition, the display unit 150 has a function of generating an alarm in the case where the fault degree exceeds the threshold value, and supports work of an operation maintenance person of the machine.

It should be noted that the information displayed on the display unit 150 is not limited to the example shown in FIG. 4. The display unit 150 may display, for example, the fault tree of the entire machine used by the fault analysis unit 140 or a result obtained by outputting the fault mode and the fault cause as a table format of FMEA (Failure Mode and Effects Analysis). In addition, the various kinds of information output from the fault analysis unit 140 are fed back to the machine in operation, and are also used for controlling the operation of the machine in accordance with the fault degree.

Second Embodiment

Figure 5:
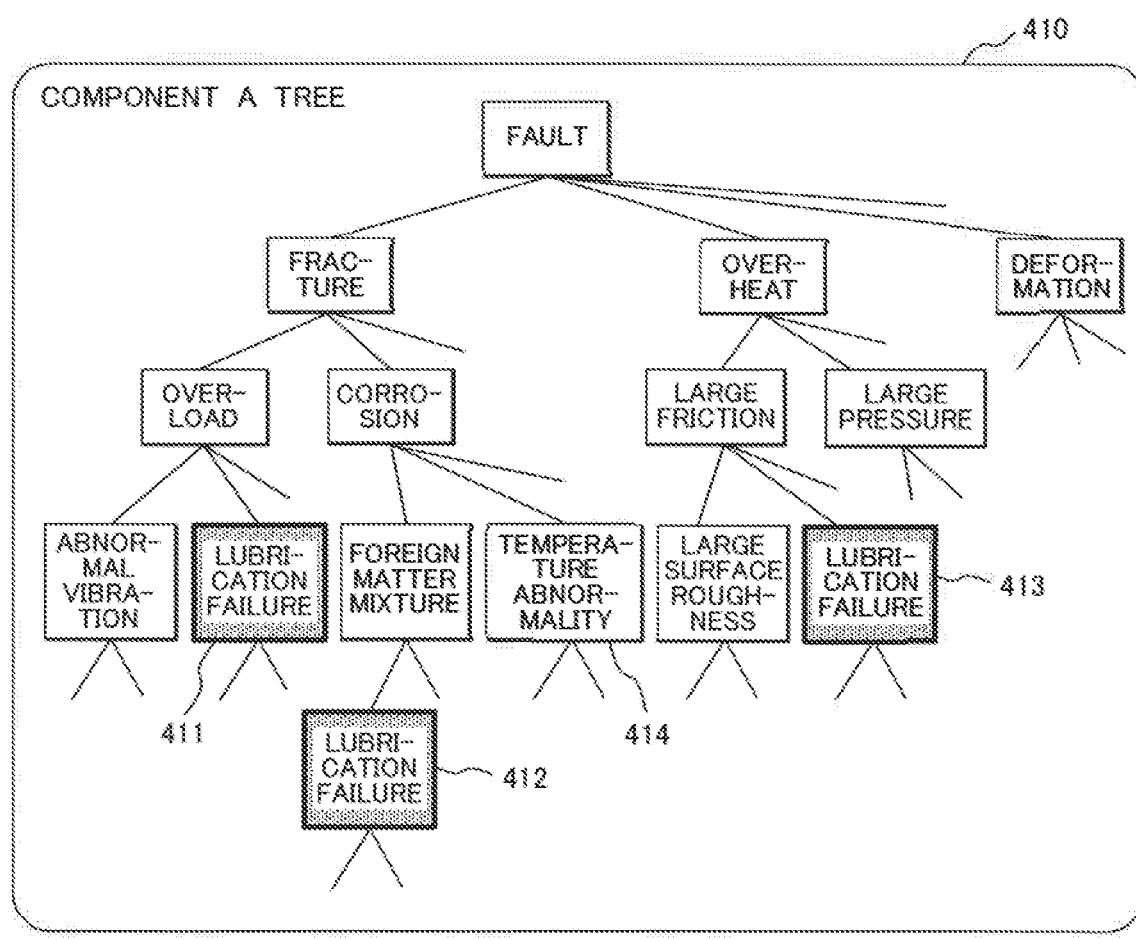
FIG. 5 is a diagram for showing a fault degree calculation method according to a second embodiment of the present invention.

FIG. 5 shows an explanatory diagram of fault degree calculation according to a second embodiment of the present invention.

In the first embodiment, the fault degree of each component or the entire machine is calculated on the basis of the abnormality degree output from the abnormality degree analysis unit 120. On the contrary, the fault degree is calculated on the basis of the content of the fault tree output from the fault tree automatic generation unit 130 in the second embodiment.

FIG. 5 shows an example in which a tree 410 of a component A is excerpted from the fault tree of the entire machine and a concrete fault mode is described in each phenomenon configuring the component A tree 410. For example, "fault" is described in the first phenomenon (top phenomenon) of the component A tree 410, and "fracture", "overheat", "deformation", and the like are described as causes in the second phenomenon thereunder. In addition, "fracture" is expanded to "overload" and "corrosion" in the third phenomenon under "fracture", and further "overload" is expanded to "abnormal vibration", "lubrication failure", and the like in the fourth phenomenon under "overload".

It should be noted that "fracture", "overheat", "deformation", "overload", "corrosion", "abnormal vibration", "lubrication failure", and the like are described as causes in the second phenomenon and thereunder. However, these can be defined in advance while being associated according to the types of sensors. For example, the temperature sensor is associated with "overheat", the load sensor is associated with "overload", the rotational speed sensor is associated with "abnormal vibration", and the flow rate sensor is associated with "lubrication failure".

Here, the component A tree 410 includes plural phenomena with the same description in some cases. For example, as shown by the thick line parts of FIG. 5, plural "lubrication failures" are included in the component A tree 410, and there are "lubrication failure" 411 lead to "overload", "lubrication failure" 412 lead to "foreign matter mixture", and "lubrication failure" 413 lead to "large friction".

This suggests that the same phenomenon affects plural fault modes. It is conceivable that the large number of phenomena with the same description possibly leads to a fault. Namely, the number of phenomena with the same description is counted when the fault degree is calculated in the second embodiment, and the fault degree is set higher as the number is larger. For example, in the case where an abnormality is sensed by the temperature sensor of a contact portion for a certain part, as shown in FIG. 5, "temperature abnormality" 414 in the tree is counted by 1. In the case where an abnormality is sensed by the lubrication oil sensor (oil quantity, viscosity, and the like) of a lubrication portion, "lubrication failures" 411, 412, and 413 in the component A tree 410 are counted by 3. In this case, the count number of "lubrication failure" is larger than that of "temperature abnormality", and thus the fault degree of the lubrication portion is set to be high.

It should be noted that when the fault degree is calculated, only the number of phenomena with the same description may be counted, or the number of phenomena of low order trees belonging to the phenomena may be inclusively counted. In addition, the fault degree may be calculated by combining the abnormality degree output from the abnormality degree analysis unit 120 with the above-described method. Further, as a characteristic of the fault tree, a higher hierarchy tends to be a serious fault mode. Thus, the position of the hierarchy of a target phenomenon is calculated, and the fault degree may be calculated by combining the position with the above-described method.

By employing the above-described embodiments, the fault tree of the entire machine is automatically generated on the basis of various data of the machine in operation. Thus, personal dependency related to tree construction can be reduced. In addition, the abnormality degree of each component and the fault degree of the entire machine are calculated in real-time on the basis of various data in operation and the automatically-generated fault tree, and thus an appropriate diagnosis can be conducted for the fault mode occurring at the time or a fault mode that will possibly occur in the future. In addition, the reliability of the machine operation can be improved by displaying the diagnosis information, by issuing an alarm, or by feeding back to the machine in operation. The present invention can be generally applied to various machines.

LIST OF REFERENCE SIGNS

100: fault diagnosis device
110: operating machine
Sa: component A sensor group
Sb: component B sensor group
Sc: component C sensor group
Sd: component D sensor group
120: abnormality degree analysis unit
130: fault tree automatic generation unit
DB: tree database
132: fault tree generation unit
140: fault analysis unit
150: display unit
DB1: component tree storage unit
DB2: fault tree storage unit
221, 410: component A tree
222: component B tree
223: component C tree
224: component D tree
411, 412, 413, 414: phenomenon in tree

The invention claimed is:

1. A fault diagnosis device for a machine in operation, the device comprising:
    an abnormality degree analysis unit that calculates the abnormality degree of each component configuring the machine by comparing output data of the machine with a threshold value;
    a fault tree automatic generation unit that holds a fault tree of each component in which the fault of each component and the fault of a sensor in each component are associated with each other and generates the fault tree of the entire machine by coupling the fault trees of the components on the basis of a correlation between the output data of each component;
    a fault analysis unit that analyzes the fault of the machine on the basis of the abnormality degree and information of the fault tree of the entire machine;
    a display unit that displays information analyzed by the fault analysis unit and issues an alarm; and
    wherein in the fault tree of the component, the fault of the sensor is described using a phenomenon that is caused by the fault, and for a fault mode that is high in the abnormality degree analyzed by the abnormality degree analysis unit, the fault analysis unit counts the number of phenomena with the same description in the fault tree of the entire machine and calculates the fault degree on the basis of the number.

2. The fault diagnosis device according to claim 1, wherein the information analyzed by the fault analysis unit is input into the machine to control an operation of the machine.

3. The fault diagnosis device according to claim 1, wherein for a fault mode that is high in the abnormality degree analyzed by the abnormality degree analysis unit, the fault analysis unit calculates the position of a hierarchy where the fault mode is written in the fault tree of the entire machine, and calculates the fault degree on the basis of the position.

4. The fault diagnosis device according to claim 1, wherein the fault of the machine analyzed by the fault analysis unit includes any one of a fault part, a fault mode, and a fault degree.

5. A machine to which the fault diagnosis device according to claim 1 is applied.

* * * * *